US012028287B2

(12) United States Patent
Choi

(10) Patent No.: US 12,028,287 B2
(45) Date of Patent: Jul. 2, 2024

(54) PARALLEL TRANSMISSION OF SEGMENTED RRC MESSAGES

(71) Applicant: Lenovo (Singapore) Pte. Ltd., New Tech Park (SG)

(72) Inventor: Hyung-Nam Choi, Ottobrunn (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 282 days.

(21) Appl. No.: 17/552,806

(22) Filed: Dec. 16, 2021

(65) Prior Publication Data

US 2023/0198716 A1    Jun. 22, 2023

(51) Int. Cl.
*H04L 5/00*       (2006.01)
*H04W 72/51*    (2023.01)

(52) U.S. Cl.
CPC .......... *H04L 5/0053* (2013.01); *H04W 72/51* (2023.01)

(58) Field of Classification Search
CPC .... H04L 5/0053; H04W 72/51; H04W 76/27; H04W 80/02
See application file for complete search history.

(56) References Cited

U.S. PATENT DOCUMENTS

2020/0146093 A1* 5/2020 Zhang .................. H04L 5/0053
2022/0417960 A1* 12/2022 Yang ................. H04W 72/1263

FOREIGN PATENT DOCUMENTS

WO        2021125712 A1    6/2021
WO    WO-2021125712 A1 *  6/2021    ............ H04W 28/06

OTHER PUBLICATIONS

PCT/IB2022/062398, "Notification of the International Search Report and the Written Opinion of the International Searching Authority, or the Declaration", International Searching Authority, Mar. 2, 2023, pp. 1-13.
3GPP, "3rd Generation Partnership Project; Technical Specification Group Radio Access Network; NR; Radio Resource Control (RRC) protocol specification (Release 16)", 3GPP TS 38.331 V16.6.0, Sep. 2021, pp. 1-961.
3GPP, 3rd Generation Partnership Project; Technical Specification Group Radio Access Network; Evolved Universal Terrestrial Radio Access (E-UTRA); Radio Resource Control (RRC); Protocol specification (Release 16), 3GPP TS 36.331 V16.6.0, Sep. 2021, pp. 1-1091.
China Unicom et al., Revision of New WID on NR QoE management and optimizations for diverse services:, 3GPP TSG RAN Meeting #92-e RP-211406, Jun. 14-18, 2021, pp. 1-5.

* cited by examiner

*Primary Examiner* — Cheikh T Ndiaye
(74) *Attorney, Agent, or Firm* — Kunzler Bean & Adamson

(57) ABSTRACT

Apparatuses, methods, and systems are disclosed for transmitting message segments in parallel. One method includes segmenting a first PDCP layer SDU message into a plurality of first segments and transmitting a first set of segmented RRC messages to a second communication entity. The first method includes segmenting a second PDCP layer SDU message into a plurality of second segments and transmitting a second set of segmented RRC messages to the second communication entity in parallel with the first set of segmented RRC messages. Each of the segmented RRC messages includes one of the first or second segments and includes a procedure number that indicates to which procedure the included segment corresponds.

20 Claims, 9 Drawing Sheets

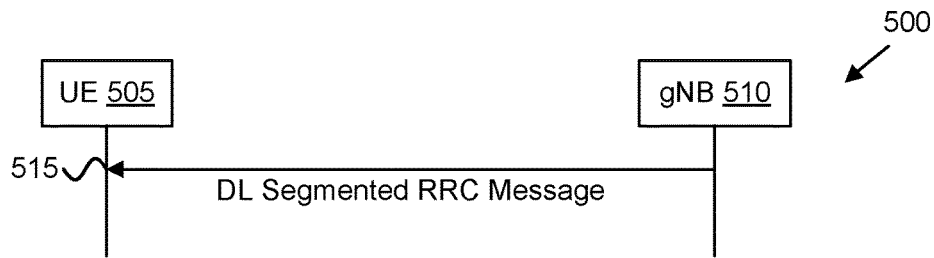

FIG. 5A

```
DLDedicatedMessageSegment2-r17-IEs ::=   SEQUENCE {
    procNumber-r17                           INTEGER (0..7),
    rrc-MessageType-r17                      ENUMERATED {rrcReconfiguration,
                                                         rrcResume, spare2, spare1}
    segmentNumber-r17                        INTEGER (0..4),
    rrc-MessageSegmentContainer-r17          OCTET STRING,
    rrc-MessageSegmentType-r17               ENUMERATED {notLastSegment, lastSegment},
    lateNonCriticalExtension                 OCTET STRING                    OPTIONAL,
    nonCriticalExtension                     SEQUENCE {}                     OPTIONAL
}
```

FIG. 5B

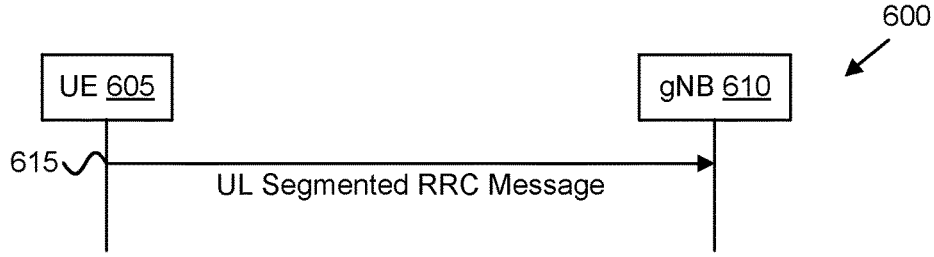

FIG. 6A

```
ULDedicatedMessageSegment2-r17-IEs ::=   SEQUENCE {
    procNumber-r17                           INTEGER (0..7),
    rrc-MessageType-r17                      ENUMERATED {ueCapabilityInformation,
                                                         measurementReportAppLayer,
                                                         spare2, spare1}
    segmentNumber-r17                        INTEGER (0..15),
    rrc-MessageSegmentContainer-r17          OCTET STRING,
    rrc-MessageSegmentType-r17               ENUMERATED {notLastSegment, lastSegment},
    lateNonCriticalExtension                 OCTET STRING                    OPTIONAL,
    nonCriticalExtension                     SEQUENCE {}                     OPTIONAL
}
```

FIG. 6B

PARALLEL TRANSMISSION OF SEGMENTED RRC MESSAGES

FIELD

The subject matter disclosed herein relates generally to wireless communications and more particularly relates to parallel transmission of message segments.

BACKGROUND

In certain wireless networks, Radio Resource Control ("RRC") protocol may be used for connection establishment and release functions, among other procedures. With regards to processing of received downlink ("DL") RRC messages, Third Generation Partnership Project ("3GPP") RRC specifications for New Radio ("NR") and Long-Term Evolution ("LTE") state that the User Equipment ("UE") is to process the received messages in order of reception, i.e., the processing of a message shall be completed before starting the processing of a subsequent message.

BRIEF SUMMARY

Disclosed are solutions for parallel transmission of message segments. Said procedures may be implemented by apparatus, systems, methods, or computer program products.

One method of a communication device for transmitting message segments in parallel includes segmenting a first Packet Data Convergence Protocol ("PDCP") layer Service Data Unit ("SDU") message into a plurality of first segments and transmitting a first set of segmented Radio Resource Control ("RRC") messages to a second communication entity, each of the first set of segmented RRC messages indicating a procedure number corresponding to the plurality of first segments and also includes a segment of the plurality of first segments. The method includes segmenting a second PDCP layer SDU message into a plurality of second segments and transmitting a second set of segmented RRC messages to the second communication entity in parallel with the first set of segmented RRC messages, each of the second set of segmented RRC messages indicating a procedure number corresponding to the plurality of second segments and also includes a segment of the plurality of second segments. Here, a first segment of the first set of segmented RRC messages is transmitted prior to transmitting a last segment of the second set of segmented RRC messages and a first segment of the second set of segmented RRC messages is transmitted prior to transmitting a last segment of the first set of segmented RRC messages.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5A is a signaling flow diagram illustrating one embodiment of a procedure for transmitting a downlink message segment;

FIG. 5B is a diagram illustrating one embodiment of Abstract Syntax Notation #1 ("ASN.1") form of a downlink message segment;

FIG. 6A is a signaling flow diagram illustrating one embodiment of a procedure for transmitting an uplink message segment;

FIG. 6B is a diagram illustrating one embodiment of ASN.1 form of an uplink message segment;

DETAILED DESCRIPTION

Figure 1:
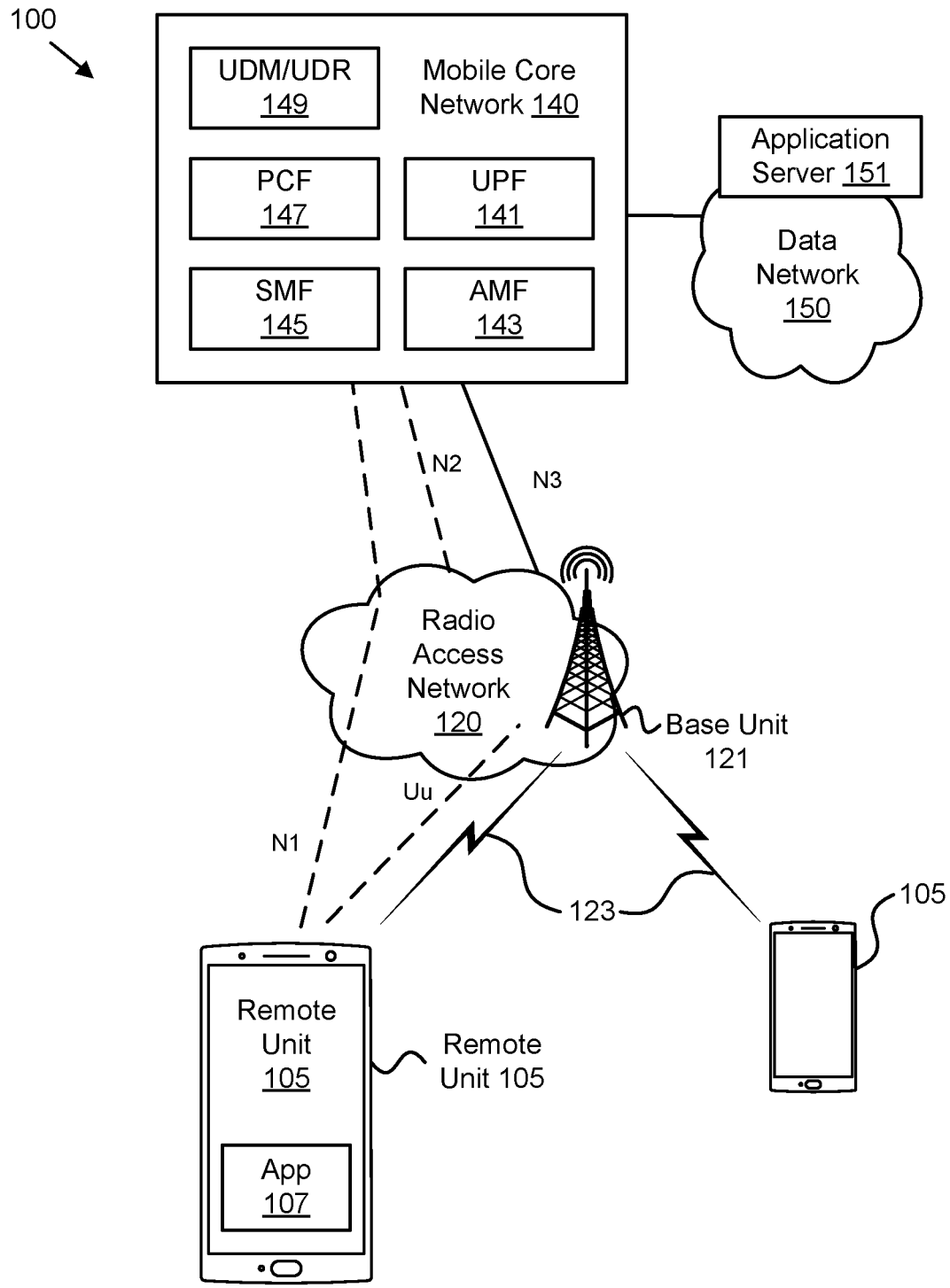
FIG. 1 is a schematic block diagram illustrating one embodiment of a wireless communication system for transmitting message segments in parallel.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for parallel transmission of message segments. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

With regards to processing of received DL RRC messages, NR and LTE RRC specifications state that the UE is to process the received messages in order of reception by RRC, i.e., the processing of a message shall be completed before starting the processing of a subsequent message. Note that the network (i.e., Radio Access Network ("RAN") and/or Core Network ("CN")) may initiate a subsequent procedure prior to receiving the UE's response of a previously initiated procedure.

Thus, the parallelization of RRC procedures is permitted from the network point of view. For instance, an RRC connection reconfiguration procedure is started in the UE upon receiving an RRCReconfiguration message from the network. The network may then send multiple RRCReconfiguration messages after each other while an RRC connection reconfiguration procedure is ongoing in the UE. Note that a RRCReconfiguration message is used to modify an RRC connection and conveys information for measurement configuration, mobility control, radio resource configuration (including Radio Bearers ("RBs"), Media Access Control ("MAC") main configuration and physical channel configuration) and Access Stratum ("AS") security configuration. For the RRCReconfiguration message the RRCReconfigurationComplete message has been specified as response message for the UE.

To avoid interactions between the parallel RRC connection reconfiguration procedures in the UE, each RRCReconfiguration message carries a parameter rrc-TransactionIdentifier ("TrId"). In one embodiment, the parameter rrc-TransactionIdentifier has a value range of 0 to 3. The TrId, together with the message type (here "RRCReconfiguration"), is used for the identification of the concerned procedure. Moreover, the parameter rrc-TransactionIdentifier is included for the RRCReconfigurationComplete message as well and the UE sets it to the same value as included in the concerned RRCReconfiguration message received from the network.

Additionally, the parameter rrc-TransactionIdentifier is included in most DL RRC messages which are specified in NR and LTE (aka Evolved UMTS Terrestrial Radio Access ("E-UTRA")). For instance, in NR it is included in CounterCheck, DLInformationTransfer, MobilityFromNRCommand, RRCReconfiguration, RRCResume, SecurityModeCommand, UECapabilityEnquiry, etc.

In some embodiments, an RRC message for RRC connection reconfiguration or for RRC connection resume may exceed the maximum RRC Protocol Data Unit ("PDU") size (i.e., equivalent to the maximum PDCP SDU size limit). In 3GPP NR, the maximum RRC PDU size is limited to 9000 bytes. In 3GPP LTE, the maximum RRC PDU size is limited to 8188 bytes. Accordingly, the 3GPP Release 16 ("Rel-16") specification allow for the segmentation of dedicated RRC messages in downlink ("DL") and uplink ("UL") in both LTE and NR systems. In DL, the RRC segmentation is applicable for the RRC connection reconfiguration and RRC connection resume messages. In UL, the RRC segmentation is applicable for the UE capability information message.

In order to transfer segments of dedicated RRC messages, new RRC segment messages have been introduced. In the downlink direction, the DLDedicatedMessageSegment message is used to transfer segments of a downlink RRC message, such as the RRCResume or RRCReconfiguration messages. In the uplink direction, the ULDedicatedMessageSegment message is used to transfer segments of an uplink RRC message, such as the UECapabilityInformation message.

When RRC segmentation is supported, the sender (i.e., network or UE) can use the new segment messages if the concerned original RRC message exceeds the maximum size of an RRC PDU. Each segment of the segmented RRC message is carried on the concerned segment message and the recipient (network or UE) of the segments reassembles them to reconstruct the original RRC message.

However, the segment messages as specified in Rel-16 do not allow the parallel transmission of segmented RRC messages in UL/DL. The reason is that the current ASN.1 format of the segment messages does not allow the recipient to identify the original RRC message that is contained in the segment message. As consequence, the recipient may not be able to reassemble the received segments correctly and thus may not be able to successfully reconstruct the original RRC message.

In order to support the parallel transmission of segmented RRC messages in UL/DL one possible remedy is the following:

The scheduling of the segments which belong to the same RRC message may be performed acc. to a defined formula, so that the recipient can unambiguously determine the received segments from different RRC messages.

The scheduling of the segmented RRC messages may be based on the cell's System Frame Number ("SFN"), subframes and time slots.

The advantage of this remedy is that it does not require any changes to the ASN.1 structures of the Rel-16 segment messages. However, the disadvantage of the remedy is that it has impacts to scheduling and requires additional functionalities in RRC, e.g., reordering and duplicate detection of received segments. Furthermore, it may be inflexible for further extensions in the future when segmentation of further RRC messages may need to be supported.

To support transmitting message segments in parallel, the following solutions may be implemented. In some embodiments, new message versions are defined for segmented RRC messages, such as DLDedicatedMessageSegment2 and ULDedicatedMessageSegment2, which indicate a procedure number with which the segment is associated and/or an RRC message type with which the procedure and segment is associated. In some embodiments, new UE capabilities are defined for indicating the support of the new segment message versions to the network. For example, a UE may indicate whether it supports the parallel reception of segmented DL RRC messages by using the extended version of the DLDedicatedMessageSegment message. As another example, a UE may indicate whether it supports the parallel transmission of segmented UL RRC messages by using the extended version of the ULDedicatedMessageSegment message.

FIG. 1 depicts a wireless communication system 100 for transmitting message segments in parallel, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for transmitting message segments in parallel apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station ("BS"), Access Point ("AP"), Integrated Access-and-Backhaul ("TAB") node, Radio Head ("RH"), etc. Additionally, the term "UE" is used for the mobile station/remote unit, but it is replaceable by any other remote device, e.g., remote unit, MS, ME, Customer Premise Equipment ("CPE"), etc. Further, the operations are described mainly in the context of 5G NR. However, the below described solutions/methods are also equally applicable to other mobile communication systems for transmitting message segments in parallel.

Note that the support of segmentation of the dedicated RRC messages is optional for both the network and the UE. For the UE the capability dl-DedicatedMessageSegmentation-r16 has been specified so that the UE can indicate to the network whether it supports the segmentation of the dedicated DL RRC messages. For the support of segmentation of the dedicated UL RRC messages there has been no capability specified for the UE in 3GPP Rel-16, i.e., the UE does not indicate to the network whether it supports the segmentation of the dedicated UL RRC messages.

Regarding UE capability transfer, with and without segmentation, the network initiates the UE capability transfer procedure with a UE in RRC_CONNECTED state when it needs UE capability information. In accordance with the setting in the UECapabilityEnquiry message (e.g., RAT type, capability filter) the UE compiles and transfers the requested UE capability information to the network in the UECapabilityInformation message.

When the network suspects/assumes that the requested UE capability information exceeds the RRC PDU size limit, the network includes a "rrc-SegAllowed" flag in the UECapabilityEnquiry message to signal to the UE that the network supports the reception of the segmented UECapabilityInformation message. If the UE supports the segmentation of the UECapabilityInformation message as well, then it performs segmentation of the UECapabilityInformation message if the size of the compiled UE capability information exceeds the RRC PDU size and sends each segment per ULDedicatedMessageSegment message.

The fact that parallel transmission of segmented RRC messages in UL/DL cannot be supported in Rel-16 can cause problems in 3GPP Release 17 ("Rel-17") considering new features to be supported/specified in Rel-17, e.g., NR QoE Measurement Collection ("QMC"). In NR QMC the RRCReconfiguration message may additionally contain one or multiple Quality of Experience ("QoE") measurement configurations, so that the total size of the measurement configurations may be larger than 9 kB.

Furthermore, in UL a new MeasurementReportAppLayer message will be introduced to carry one or multiple QoE measurement reports which the UE created in accordance with the received QoE measurement configurations. As result, the size of the uplink MeasurementReportAppLayer message may also exceed the RRC PDU size limit. Thus, both messages may need to be segmented. So, in view of NR QMC the support of parallel transmission of segmented RRC messages in UL/DL will be beneficial.

Figure 2:
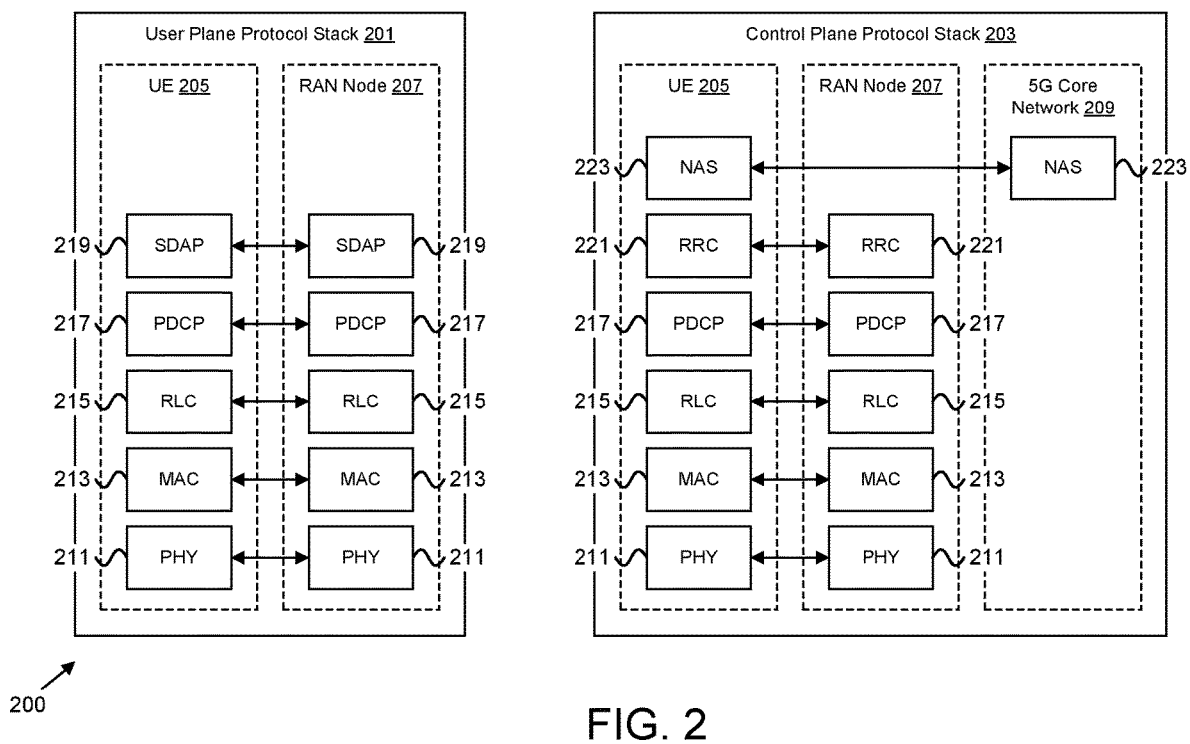
FIG. 2 is a diagram illustrating one embodiment of a NR protocol stack.

FIG. 2 depicts a protocol stack 200, according to embodiments of the disclosure. While FIG. 2 shows a UE 205, a RAN node 207 and the 5G core network 209, these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 211, a Medium Access Control ("MAC") sublayer 213, the Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a physical layer 211, a MAC sublayer 213, a RLC sublayer 215, and a PDCP sublayer 217. The Control Place protocol stack 203 also includes a Radio Resource Control ("RRC") layer 221 and a Non-Access Stratum ("NAS") layer 223.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 221 and the NAS layer 223 for the control plane and includes, e.g., an Internet Protocol ("IP") layer (not depicted) for the user plane. L1 and L2 are referred to as "lower layers," while L3 and above (e.g., transport layer, application layer) are referred to as "higher layers" or "upper layers."

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 offers QoS flows to the core network (e.g., 5GC 209). The RRC layer 221 provides for the addition, modification, and release of Carrier Aggregation and/or Dual Connectivity. The RRC layer 221 also manages the establishment, configuration, maintenance, and release of Signaling Radio Bearers ("SRBs") and Data Radio Bearers ("DRBs").

As used herein, a service data unit ("SDU") refers to a unit of data that has been passed down from a higher layer (or sublayer) to a lower layer. A SDU is then encapsulated into the lower layer's protocol data unit ("PDU") and the process continues until reaching the lowest layer of the protocol stack, i.e., physical layer. Accordingly, a SDU is a set of data that is sent by a user of the services of a given layer, and is transmitted semantically unchanged to a peer service user. In contrast, the PDU specifies the data that will be sent to the peer protocol layer at the receiving end, as opposed to being sent to a lower layer.

Regarding Quality of Experience Measurement Collection ("QMC"), measurement collection is supported for various service types (e.g., for streaming media, Multimedia Telephony Service for IP multimedia subsystem ("MTSI") and Virtual Reality ("VR")). The feature allows the operators to collect and utilize the QoE measurement information for various service types to better understand the user experience and optimize their NR network for the concerned services. For NR two methods will be supported how Operation and Maintenance ("OAM") can initiate QMC activation/deactivation: Signaling-based and management-based initiation.

The signaling-based method is a control plane method wherein the CN is involved and the CN determines the qualified UEs to send the QoE measurement configuration. According to this method the OAM initiates QMC, but actually CN activates it towards RAN. The following descriptions outline an exemplary message flow of signaling-based initiation for QMC activation.

At Step 0, the RAN receives UE capability information from UE AS layer, amongst other whether it supports QMC or not.

At Step 1, the OAM is interested in receiving QoE measurements for certain services from UEs which are being serviced in a PLMN and sends to CN a "Configure QoE measurement" message including QoE measurement configuration. The QoE measurement configuration may include parameters such as PLMN target, session to record of an application, service type, area scope (list of cells or list of Tracking Areas ("TAs")), QoE reference (final destination for the QoE measurement reports to send, e.g., Trace Collection Entity ("TCE") and/or Measurement Collection Entity ("MCE")), QoE metrics of the concerned service type (including start time and duration of recording). For instance, QoE metrics for streaming services include amongst other Average Throughput, Initial Playout Delay, Buffer Level, Play List, Device information.

At Step 2, in accordance with the received QoE measurement configuration from OAM, the CN activates the QoE measurement configuration for a qualified UE and forwards the QoE measurement configuration to RAN using an "Activate QoE measurement" message.

At Step 3, the RAN sends the QoE measurement configuration in a DL RRC message to the UE AS layer.

At Step 4, the UE AS layer sends the received QoE measurement configuration to its application layer (AL) using AT command.

At Step 5, the UE Application layer ("UE AL") starts QoE measurement collection in accordance with the received QoE measurement configuration.

At Step 6, if the QoE measurement collection has been completed, then the UE AL sends the collected QoE measurement results to its AS layer in a QoE measurement report using AT command.

At Step 7, the UE AS layer sends the QoE measurement report in a UL RRC message to the RAN.

At Step 8, the RAN forwards the received QoE measurement report to TCE/MCE.

Note that the RRC messages in step 3 and step 7 may need to be segmented if they exceed the RRC PDU size limit. The RRC message in step 3 may be the RRCReconfiguration message and the RRC message in step 7 may be the MeasurementReportAppLayer message. The RRCReconfiguration message may contain one or multiple QoE measurement configurations, so that the total size of the measurement configurations may be larger than 9000 bytes. The MeasurementReportAppLayer message may contain one or multiple QoE measurement reports, so that the total size of the measurement reports may be larger than 9000 bytes.

Disclosed herein are solutions for parallel transfer of segmented RRC messages, where message segments of a first RRC message may be interspersed with messages segments of a second RRC message. These solutions enable the receiving device to distinguish message segments of the first RRC message from message segments of the second RRC message, so that segmented RRC messages with the same segment number are not discarded as duplicates when said segments belong to different RRC messages.

Figure 3:
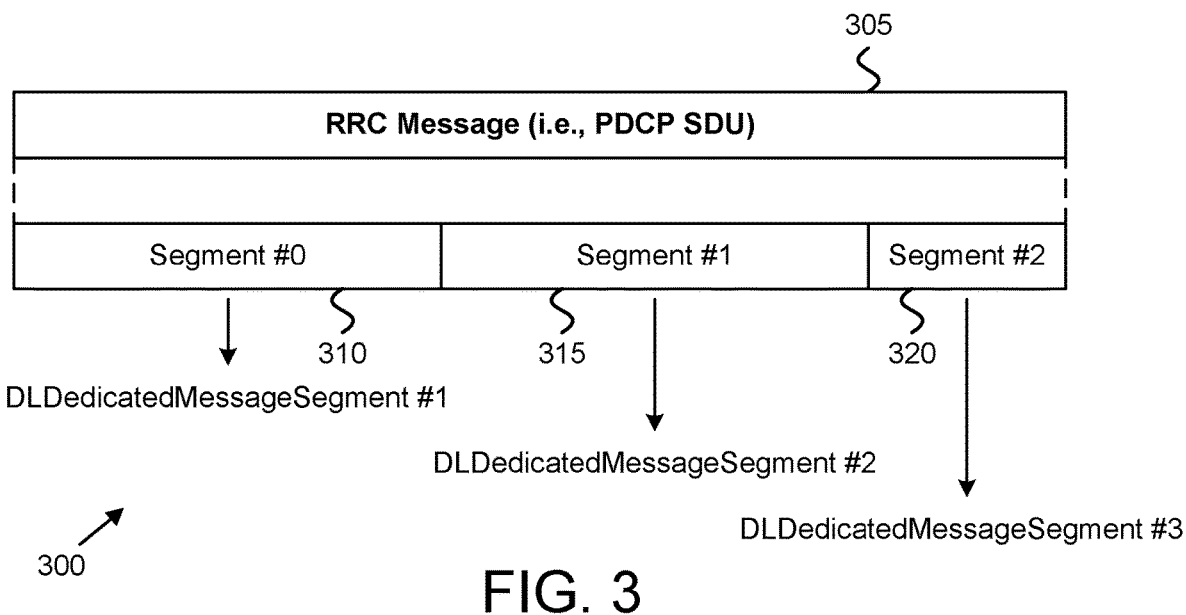
FIG. 3 is a diagram illustrating one embodiment of segmenting an RRC message.

FIG. 3 depicts an example decomposition 300 of a downlink RRC message 305, according to embodiments of the disclosure. In one embodiment, the downlink RRC message 305 may be a RRCReconfiguration message in NR, as discussed above. As a prerequisite, the PDCP layer 217 passes a PDCP SDU to the MAC layer 215. In the depicted example, it is assumed that the downlink RRC message 305 has a size of 24 kB, and thus exceeds the maximum size of an RRC PDU of 9000 bytes.

Because the PDCP SDU message corresponding to the RRC message 305 is larger than the maximum size, the network performs segmentation of the message into three segments (denoted "Segment #0," "Segment #1," and "Segment #2"), where each segment is less than or equal to the RRC PDU size limit. Additionally, each segment of the downlink RRC message 305 is transferred in a different segmented RRC message. Specifically, Segment #0 310 is transferred in a first segmented RRC message (denoted "DLDedicatedMessageSegment #1"), Segment #1 315 is transferred in a second segmented RRC message (denoted "DLDedicatedMessageSegment #2"), and Segment #2 320 is transferred in a third segmented RRC message (denoted "DLDedicatedMessageSegment #3").

Figure 4:
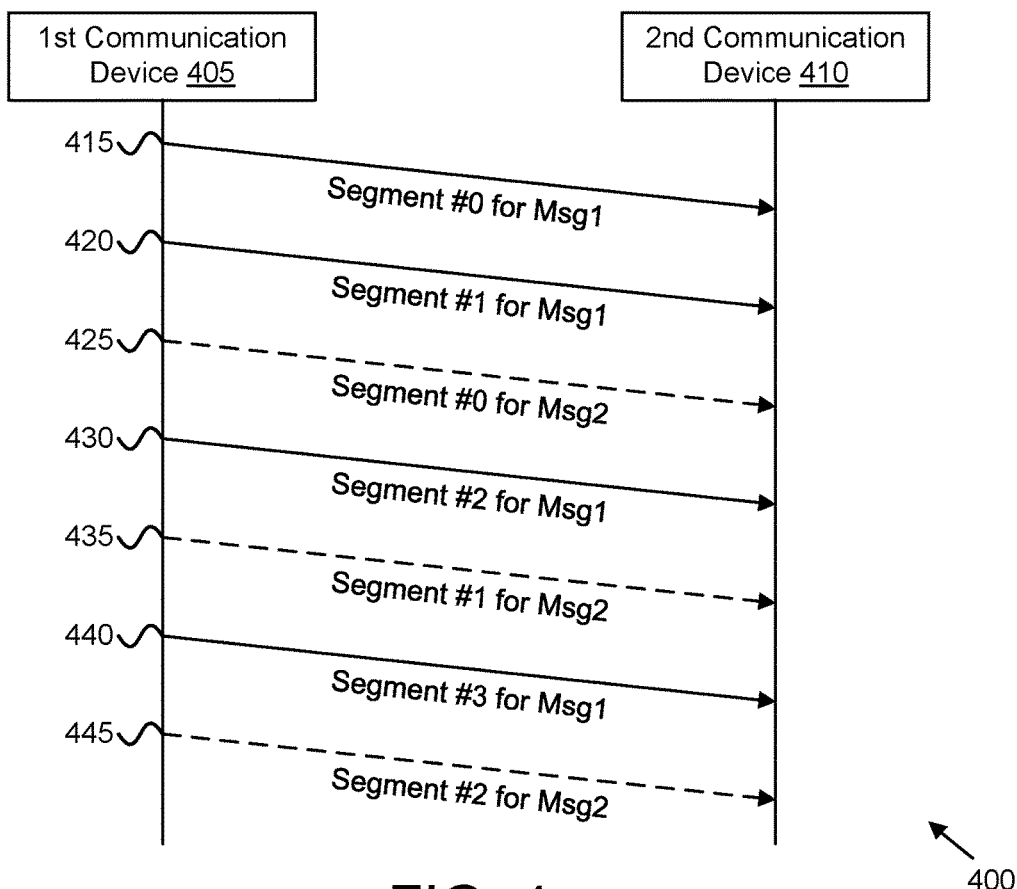
FIG. 4 is a signaling flow diagram illustrating one embodiment of a procedure for transmitting message segments of a first RRC message and a second RRC message.

FIG. 4 depicts an example for the parallel transmission 400 of segmented RRC messages from a first communication device 405 to a second communication device 410. Here, the first communication device 405 transmits a first set of segmented RRC messages corresponding to a first RRC message (denoted "Msg1") and concurrently transmits a second set of segmented RRC messages corresponding to a second RRC message (denoted "Msg2"). Note that a first one of the first set of segmented RRC messages is transmitted prior to a last one of the second set of segmented RRC messages and a first one of the second set of segmented RRC messages is transmitted prior to a last one of the first set of segmented RRC messages. Prior to transmission, it is assumed that Msg1 is segmented into four segments (i.e., Segment #0 to #3) and Msg2 is segmented into three segments (i.e., Segment #0 to #2).

In one embodiment, the parallel transmission 400 of segmented RRC messages occurs in the downlink direction, such that the first communication device 405 is a RAN node (such as the RAN node 207) and the second communication device 410 is a UE (such as the UE 205). In this embodiment, the Msg1 and Msg2 may each be RRC reconfiguration messages, e.g., corresponding to parallel RRC connection reconfiguration procedures in the UE. In another embodiment, the parallel transmission 400 of segmented RRC messages occurs in the uplink direction, such that the first communication device 405 is a UE (such as the UE 205) and the second communication device 410 is a RAN node (such as the RAN node 207). In this embodiment, the Msg1 and Msg2 may be UE capability information messages, measurement report message, or combinations thereof.

As depicted, the first communication device 405 transmits the segments with continuously increasing segment number and the second communication device 410 expects to receive each set of segments in order. However, because Msg1 and Msg2 are transmitted in parallel—and not sequentially—at least one segment of Msg2 is interlaced between segments of Msg1 and/or at least one segment of Msg1 is interlaced between segments of Msg2. See, for example, messages 420-435.

Without reordering functionality for the received segments specified in RRC, the second communication device 410 would consider the received out of sequence segments for Msg2 as duplicates of Msg1 and thus discard them. In such situation, the second communication device 410 would only reassemble the received segments for Msg1, having discarded the segments of Msg2. Therefore, to enable reassembly of message segments for RRC messages sent in parallel, each segmented RRC message contains an indication of which RRC message the segment corresponds. In some embodiments, each segmented RRC message may contain one or more parameters that indicate to which RRC message it corresponds.

At Step 1, the first communication device 405 transmits a first segmented RRC message, i.e., Segment #0 for Msg1, to the second communication device 410 (see messaging 415). Here, the first segmented RRC message contains an indication that it contains a segment of Msg1.

At Step 2, the first communication device 405 transmits a second segmented RRC message, i.e., Segment #1 for Msg1, to the second communication device 410 (see messaging 420). Here, the second segmented RRC message contains an indication that it contains a segment of Msg1.

At Step 3, the first communication device 405 transmits a third segmented RRC message, i.e., Segment #0 for Msg2, to the second communication device 410 (see messaging 425). Here, the third segmented RRC message contains an indication that it contains a segment of Msg2.

At Step 4, the first communication device 405 transmits a fourth segmented RRC message, i.e., Segment #2 for Msg1, to the second communication device 410 (see messaging 430). Here, the fourth segmented RRC message contains an indication that it contains a segment of Msg1.

At Step 5, the first communication device 405 transmits a fifth segmented RRC message, i.e., Segment #1 for Msg2, to the second communication device 410 (see messaging 435). Here, the fifth segmented RRC message contains an indication that it contains a segment of Msg2.

At Step 6, the first communication device 405 transmits a sixth segmented RRC message, i.e., Segment #3 for Msg1, to the second communication device 410 (see messaging 440). Here, the sixth segmented RRC message contains an indication that it contains a segment of Msg1.

At Step 7, the first communication device 405 transmits a seventh segmented RRC message, i.e., Segment #2 for Msg2, to the second communication device 410 (see messaging 445). Here, the seventh segmented RRC message contains an indication that it contains a segment of Msg2.

The second communication device 410 reassembles the received segments for each original RRC message. In one embodiment, each segmented RRC message contains a procedure number that indicates a RRC message to which the included segment corresponds. The procedure number is discussed in greater detail below with reference to FIGS. 5B and 6B. Accordingly, the second communication device 410 is able to successfully reconstruct the original RRC messages.

FIG. 5A depicts a procedure 500 for transmitting a downlink message segment 515 from a UE 505 to a gNB 510, according to embodiments of the disclosure. As discussed above, the segmentation is performed in the RRC protocol layer only when the concerned RRC message exceeds the maximum size of an RRC PDU (8188 bytes in LTE, 9000 bytes in NR). Each downlink message segment 515 (denoted "DL Segmented RRC Message") carries a single segment of the concerned RRC message. In various embodiments, the downlink message segment 515 is an extended downlink message segment, described below with reference to FIG. 5B.

FIG. 5B depicts the ASN.1 structure of an extended downlink message segment 515 that supports the parallel transmission of segmented RRC messages in the downlink direction, according to embodiments of the disclosure. In the depicted example, a new version of the downlink message segment Information Element ("IE") DLDedicatedMessageSegment is defined, denoted as "DLDedicatedMessageSegment2-r17-IEs." Here, the Rel-16 DLDedicatedMessageSegment IE is modified to include a new procedure number parameter (denoted "procNumber") and a new RRC message type parameter (denoted "rrc-MessageType").

The procNumber parameter indicates the procedure number to which the message segment is associated. As depicted, the IE parameter procNumber-r17 may be an integer having a value between 0 and 7.

The rrc-MessageType parameter indicates the type RRC message associated with the procedure and segment. As depicted, the IE parameter rrc-MessageType-r17 may be an enumerated value. For a downlink message segment, the value "rrcReconfiguration" refers to the RRCReconfiguration message and the value "rrcResume" refers to the RRCResume message.

The segmentNumber parameter identifies the sequence number of a segment within the encoded message. The sender (i.e., the gNB) transmits the segments with continuously increasing segmentNumber order so that the recipient may expect to obtain them in the correct order. For the new version of the downlink message segment, a maximum number of 5 segments may be specified.

The rrc-MessageSegmentContainer parameter includes a segment of the encoded message. The size of the included segment in this container should not exceed the RRC PDU size limit. The rrc-MessageSegmentType parameter indicates whether the included message segment is the last segment of the message or not.

The new version of the downlink message segment supports the parallel transmission of segmented RRC messages for at least the RRCReconfiguration message and the RRCResume message in downlink. Moreover, the new segment messages are extensible and can additionally support other RRC message types as well, if deemed necessary.

FIG. 6A depicts a procedure 600 for transmitting an uplink message segment from a UE 605 to a gNB 610, according to embodiments of the disclosure. As discussed above, the segmentation is performed in the RRC protocol layer only when the concerned RRC message exceeds the maximum size of an RRC PDU (8188 bytes in LTE, 9000 bytes in NR). Each uplink message segment 615 (denoted "UL Segmented RRC Message") carries a single segment of the concerned RRC message. In various embodiments, the uplink message segment 615 is an extended uplink message segment, described below with reference to FIG. 6B.

FIG. 6B depicts the ASN.1 structure of an extended uplink message segment 615 that supports the parallel transmission of segmented RRC messages in the uplink direction, according to embodiments of the disclosure. In the depicted example, a new version of the uplink message segment IE ULDedicatedMessageSegment is defined, denoted as "ULDedicatedMessageSegment2-r17-IEs." Here, the Rel-16 ULDedicatedMessageSegment IE is modified to include a new procedure number parameter (denoted "procNumber") and a new RRC message type parameter (denoted "rrc-MessageType").

The procNumber parameter indicates the procedure number to which the message segment is associated. As depicted, the IE parameter procNumber-r17 may be an integer having a value between 0 and 7.

The rrc-MessageType parameter indicates the type RRC message associated with the procedure and segment. As depicted, the IE parameter rrc-MessageType-r17 may be an enumerated value. For an uplink message segment, the value "ueCapabilityInformation" refers to the UECapablityInformation message and the value "measurementReportAppLayer" refers to the MeasurementReportAppLayer message.

The segmentNumber parameter identifies the sequence number of a segment within the encoded message. The sender (i.e., the UE) transmits the segments with continuously increasing segmentNumber order so that the recipient may expect to obtain them in the correct order. For the new version of the uplink message segment, a maximum number of 16 segments may be specified.

The rrc-MessageSegmentContainer parameter includes a segment of the encoded message. The size of the included segment in this container should not exceed the RRC PDU size limit. The rrc-MessageSegmentType parameter indicates whether the included message segment is the last segment of the message or not.

The new version of the uplink message segment supports the parallel transmission of segmented RRC messages for at least the UECapablityInformation message and the MeasurementReportAppLayer message in uplink. Moreover, the new segment messages are extensible and can additionally support other RRC message types as well, if deemed necessary.

Note that the support of the new message versions for DLDedicatedMessageSegment and ULDedicatedMessageSegment is optional for both UE and network. For the UE the following new capabilities are introduced for indicating the support of the new segment message versions to the network:

The capability dl-extendedDedicatedMessageSegmentation indicates whether the UE supports the parallel reception of segmented DL RRC messages by using the extended version of the DLDedicatedMessageSegment message.

The capability ul-extendedDedicatedMessageSegmentation indicates whether the UE supports the parallel transmission of segmented UL RRC messages by using the extended version of the ULDedicatedMessageSegment message.

It is assumed that when both UE and network support the new message versions for DLDedicatedMessageSegment and ULDedicatedMessageSegment, then they support the Rel-16 DLDedicatedMessageSegment and ULDedicatedMessageSegment messages as well.

In the following some embodiments with regards to the proposed solutions are described. Although the proposed solutions and the described embodiments focus on NR, they are principally applicable to LTE as well.

According to embodiments of the first solution, both a UE and RAN support parallel transmission of segmented RRC messages in the downlink direction. In the first solution, it is assumed that both the UE and the RAN support the new extended version of DLDedicatedMessageSegment as shown in FIG. 5B. It is further assumed that both UE and network support the Rel-17 NR QMC feature. In some embodiments, the UE indicates its support to the network by sending the capability dl-extendedDedicatedMessageSegmentation in the UECapabilityInformation message.

In various embodiments, the network sends—to a UE in RRC_CONNECTED state—two RRCReconfiguration messages after each other. The first message includes the parameter rrc-TransactionIdentifier set to "1". In one embodiment, the first message modifies the UE's radio resource configuration. The second message includes the parameter rrc-TransactionIdentifier set to "2". In one embodiment, the second message sends multiple NR QoE measurement configurations. Here, it is assumed that both RRC messages exceed the RRC PDU size limit of 9000 bytes (note that the total size of both RRC messages exceed 45 kB).

Accordingly, the network node (i.e., a RAN node) segments each RRCReconfiguration message into a plurality of RRC message segments, also referred to as "segmented RRC messages." The first RRCReconfiguration message is associated with a first procedure and the second RRCReconfiguration message is associated with a second procedure. Each segmented RRC message corresponding to the first RRCReconfiguration message includes a procedure number value pointing to the first RRCReconfiguration message, and each segmented RRC message corresponding to the second RRCReconfiguration message includes a procedure number value pointing to the second RRCReconfiguration message.

Figure 7:
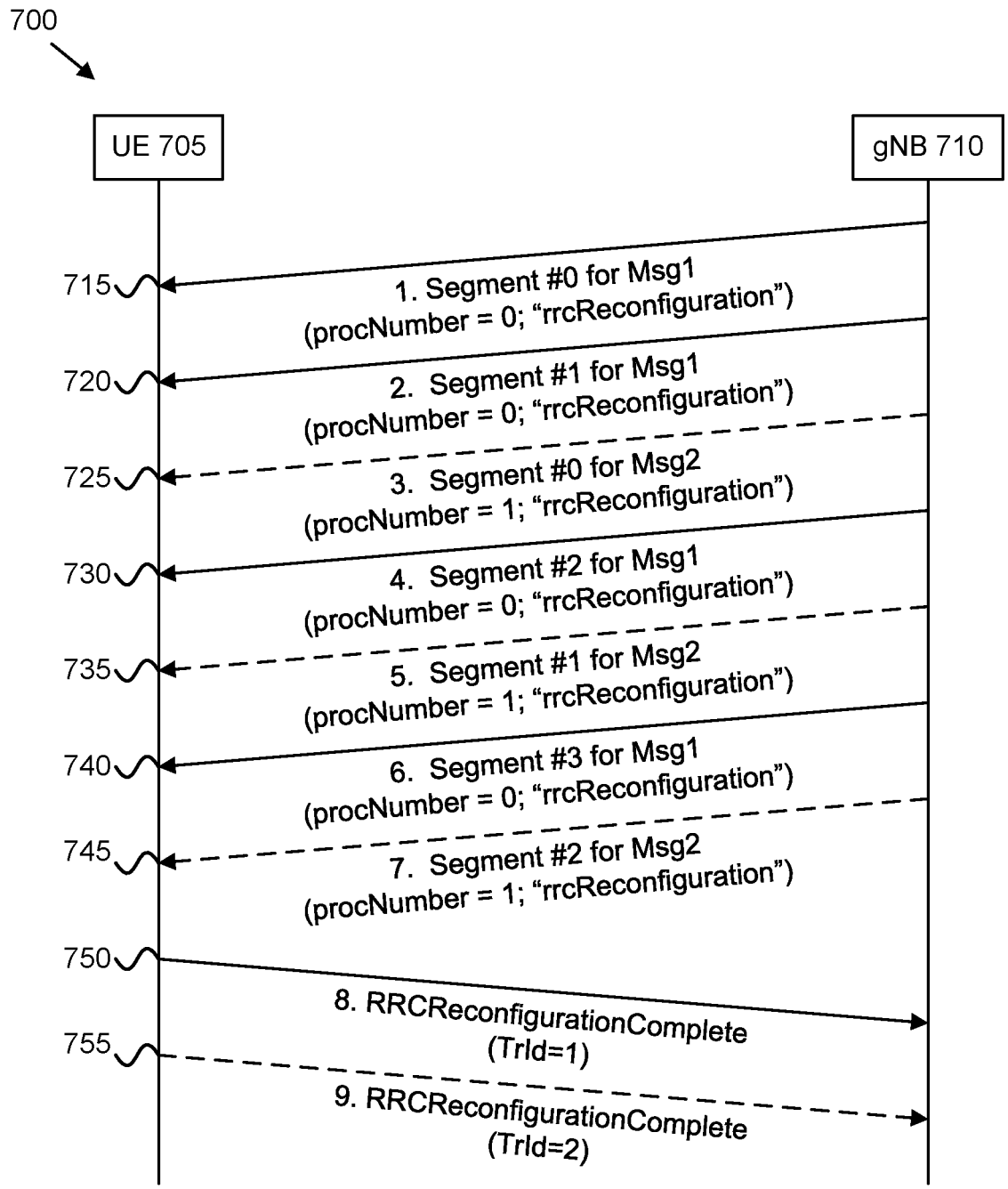
FIG. 7 is a signaling flow diagram illustrating one embodiment of a procedure for transmitting downlink message segments of a first RRC message and a second RRC message.

FIG. 7 depicts an exemplary message flow of a procedure 700 for parallel transmission of segmented downlink messages from the gNB 710 to the UE 705, according to embodiments of the first solution. In the depicted embodiments, each segmented RRC message uses the new extended version of DLDedicatedMessageSegment (denoted as "DLDedicatedMessageSegment2") described above with reference to FIG. 5B. The gNB 710 generates two RRC messages for transfer to the UE 705. Here, it is assumed that each generated RRC message would exceed the RRC size limit. In certain embodiments, the generated RRC messages are each RRCReconfiguration messages, where the first RRCReconfiguration message has rrc-TransactionIdentifier set to "1" and the second RRCReconfiguration message has rrc-TransactionIdentifier set to "2".

In the depicted embodiments, the first RRCReconfiguration message (denoted "Msg1") is segmented into four segments (Segment #0 to #3) and for each segment the parameter "procNumber" is set to "0". The second RRCReconfiguration message (denoted "Msg2") is segmented into three segments (Segment #0 to #2) and for each segment the parameter "procNumber" is set to "1". Moreover, for each segmented RRC message the parameter "rrc-MessageType" is set to "rrcReconfiguration."

At Step 1, the gNB 710 sends a first segmented RRC message, i.e., Segment #0 for Msg1, to the UE 705 (see messaging 715). Here, the new parameters of DLDedicatedMessageSegment2 are set as follows: procNumber=0; rrc-MessageType="rrcReconfiguration."

At Step 2, the gNB 710 sends a second segmented RRC message, i.e., Segment #1 for Msg1, to the UE 705 (see messaging 720). Here, the new parameters of DLDedicatedMessageSegment2 are set as follows: procNumber=0; rrc-MessageType="rrcReconfiguration."

At Step 3, the gNB 710 sends a third segmented RRC message, i.e., Segment #0 for Msg2, to the UE 705 (see messaging 725). Here, the new parameters of DLDedicatedMessageSegment2 are set as follows: procNumber=1; rrc-MessageType="rrcReconfiguration."

At Step 4, the gNB 710 sends a fourth segmented RRC message, i.e., Segment #2 for Msg1, to the UE 705 (see messaging 730). Here, the new parameters of DLDedicatedMessageSegment2 are set as follows: procNumber=0; rrc-MessageType="rrcReconfiguration."

At Step 5, the gNB 710 sends a fifth segmented RRC message, i.e., Segment #1 for Msg2, to the UE 705 (see messaging 735). Here, the new parameters of DLDedicatedMessageSegment2 are set as follows: procNumber=1; rrc-MessageType="rrcReconfiguration."

At Step 6, the gNB 710 sends a sixth segmented RRC message, i.e., Segment #3 for Msg1, to the UE 705 (see messaging 740). Here, the new parameters of DLDedicatedMessageSegment2 are set as follows: procNumber=0; rrc-MessageType="rrcReconfiguration."

At Step 7, the gNB 710 sends a seventh segmented RRC message, i.e., Segment #2 for Msg2, to the UE 705 (see messaging 745). Here, the new parameters of DLDedicatedMessageSegment2 are set as follows: procNumber=1; rrc-MessageType="rrcReconfiguration."

The UE reassembles the received segments for each RRCReconfiguration message according to the sequence number, the parameter procNumber and the parameter rrc-MessageType. It is assumed that the UE was able to successfully reconstruct the original RRCReconfiguration messages.

At Step 8, the UE 705 sends a first RRCReconfigurationComplete message to the gNB 710 as a response to the first RRCReconfiguration message (see messaging 750).

At Step 8, the UE 705 sends a second RRCReconfigurationComplete message to the gNB 710 as a response to the second RRCReconfiguration message (see messaging 755).

According to embodiments of the second solution, both a UE and RAN support parallel transmission of segmented RRC messages in the uplink direction. In the second solution, it is assumed that both the UE and the RAN support the new extended version of ULDedicatedMessageSegment as shown in FIG. 6B. In some embodiments, the UE indicates its support to the network by sending the capability ul-extendedDedicatedMessageSegmentation in the UECapabilityInformation message. It is further assumed that both UE and network support the Rel-17 NR QMC feature and multiple NR QoE measurements have been configured by the network.

In various embodiments, a UE in RRC_CONNECTED state sends—to the network—two uplink RRC messages after each other. In one embodiment, one of the RRC messages is a UECapabilityInformation message sent from UE to the network upon reception (by the UE) of a UECapabilityEnquiry message from the network, in which UE capability information is requested (e.g., support for LTE). In another embodiment, one of the RRC messages is a MeasurementReportAppLayer message which carries one QoE measurement report. Here, it is assumed that both RRC messages exceed the RRC PDU size limit of 9000 bytes (note that the total size of both RRC messages exceed 45 kB).

In one embodiment, the first message sends UE capability information. In another embodiment, the second message sends one NR QoE measurement report.

Accordingly, the UE segments each uplink RRC message into a plurality of RRC message segments, also referred to as "segmented RRC messages." The first RRC message is associated with a first procedure. The second RRC message is associated with a second procedure. Each segmented RRC message corresponding to the first RRC message (e.g., UECapabilityInformation message) includes a procedure number value pointing to the first RRC message, and each segmented RRC message corresponding to the second RRC message (e.g., the MeasurementReportAppLayer message) includes a procedure number value pointing to the second RRC message.

Figure 8:
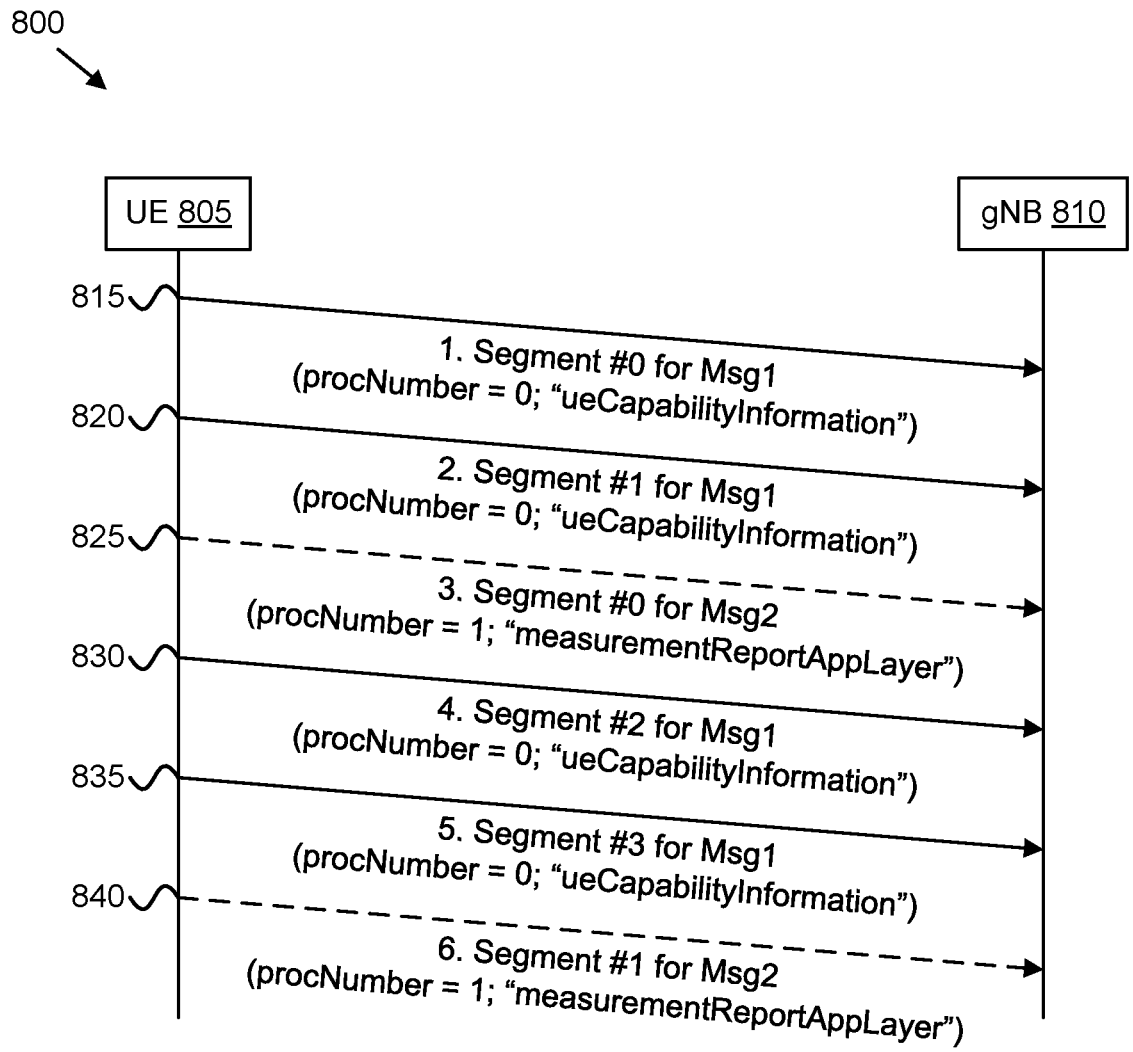
FIG. 8 is a signaling flow diagram illustrating one embodiment of a procedure for transmitting uplink message segments of a first RRC message and a second RRC message.

FIG. 8 depicts an exemplary message flow of a procedure 800 for parallel transmission of segmented uplink messages from the UE 805 to the gNB 810, according to embodiments of the second solution. In the depicted embodiments, each segmented RRC message uses the new extended version of ULDedicatedMessageSegment (denoted as "ULDedicatedMessageSegment2") described above with reference to FIG. 6B. The UE 805 generates two RRC messages for transfer to the gNB 810. Here, it is assumed that each generated RRC message would exceed the RRC size limit. As depicted, the first generated RRC message is a UE capability information message and the second generated RRC message is an application layer measurement report message.

In the depicted embodiments, the UE capability information message (denoted "Msg1") is segmented into four segments (Segment #0 to #3). For each Msg1 segment, the parameter procNumber is set to "0" and the parameter rrc-MessageType is set to "ueCapabilityInformation". The application layer measurement report message (denoted "Msg2") is segmented into two segments (Segment #0 to #1). For each Msg2 segment, the parameter procNumber is set to "1" and the parameter rrc-MessageType is set to "measurementReportAppLayer".

At Step 1, the UE 805 sends a first segmented RRC message, i.e., Segment #0 for Msg1, to the gNB 810 (see messaging 815). Here, the new parameters of ULDedicatedMessageSegment2 are set as follows: procNumber=0; rrc-MessageType="ueCapabilityInformation."

At Step 2, the UE 805 sends a second segmented RRC message, i.e., Segment #1 for Msg1, to the gNB 810 (see messaging 820). Here, the new parameters of ULDedicatedMessageSegment2 are set as follows: procNumber=0; rrc-MessageType="ueCapabilityInformation."

At Step 3, the UE 805 sends a third segmented RRC message, i.e., Segment #0 for Msg2, to the gNB 810 (see messaging 825). Here, the new parameters of ULDedicatedMessageSegment2 are set as follows: procNumber=1; rrc-MessageType="measurementReportAppLayer."

At Step 4, the UE 805 sends a fourth segmented RRC message, i.e., Segment #2 for Msg1, to the gNB 810 (see messaging 830). Here, the new parameters of ULDedicatedMessageSegment2 are set as follows: procNumber=0; rrc-MessageType="ueCapabilityInformation."

At Step 5, the UE 805 sends a fifth segmented RRC message, i.e., Segment #3 for Msg1, to the gNB 810 (see messaging 835). Here, the new parameters of ULDedicatedMessageSegment2 are set as follows: procNumber=0; rrc-MessageType="ueCapabilityInformation."

At Step 6, the UE 805 sends a sixth segmented RRC message, i.e., Segment #1 for Msg2, to the gNB 810 (see messaging 840). Here, the new parameters of ULDedicatedMessageSegment2 are set as follows: procNumber=1; rrc-MessageType="measurementReportAppLayer."

The gNB 810 reassembles the received segments for each uplink segmented RRC message according to the sequence number, the parameter procNumber and the parameter rrc-MessageType.

Figure 9:
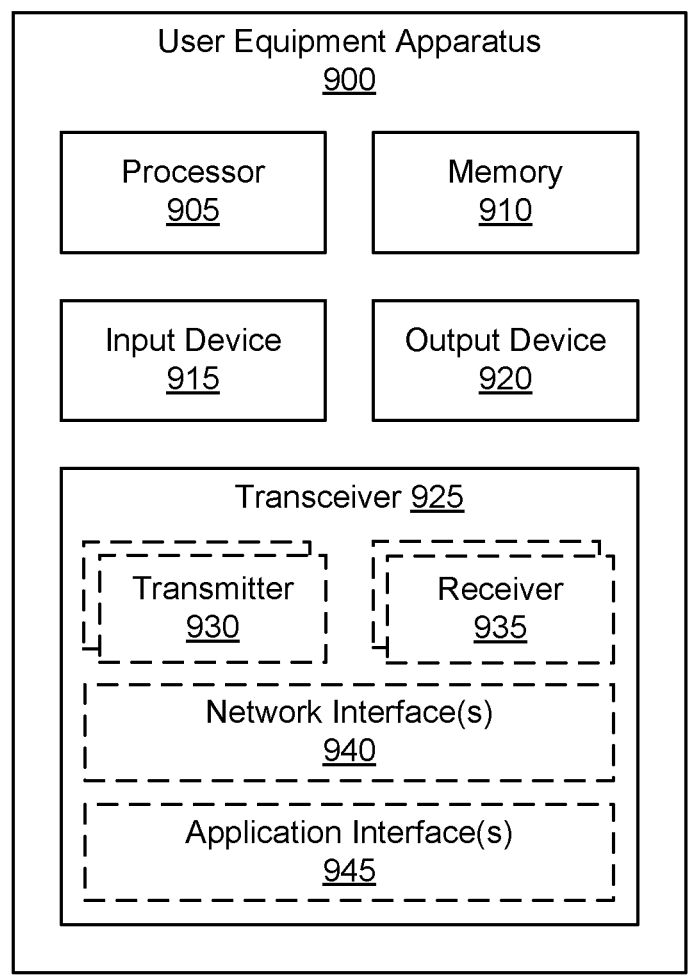
FIG. 9 is a diagram illustrating one embodiment of a user equipment apparatus that may be used for transmitting message segments in parallel.

FIG. 9 depicts a user equipment apparatus 900 that may be used for transmitting message segments in parallel, according to embodiments of the disclosure. In various embodiments, the user equipment apparatus 900 is used to implement one or more of the solutions described above. The user equipment apparatus 900 may be one embodiment of the remote unit 105, the UE 205, the first communication device 405, the second communication device 410, the UE 505, the UE 605, the UE 705, and/or the UE 805, described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panels supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the processor 905 controls the user equipment apparatus 900 to implement the above described UE behaviors. In certain embodiments, the processor 905 may include an application processor (also known as "main processor") which manages application-domain and operating system ("OS") functions and a baseband processor (also known as "baseband radio processor") which manages radio functions.

In various embodiments, the processor 905 segments a first PDCP layer SDU message into a plurality of first segments and the transceiver 925 transmits a first set of segmented RRC message to a RAN node (i.e., via an air/radio interface), each of the first set of segmented RRC messages including one of the plurality of first segments and a procedure number that indicates a procedure to which the included segment corresponds.

The processor 905 also segments a second PDCP layer SDU message into a plurality of second segments and the transceiver 925 transmits a second set of segmented RRC messages to the RAN node in parallel with the first set of segmented RRC messages, each of the second set of segmented RRC messages including one of the plurality of second segments and a procedure number that indicates a procedure to which the included segment corresponds. Here, a first segment of the first set of segmented RRC messages is transmitted prior to transmitting a last segment of the second set of segmented RRC messages and a first segment of the second set of segmented RRC messages is transmitted prior to transmitting a last segment of the first set of segmented RRC messages.

In some embodiments, each of the first and second segmented RRC messages further includes a message type parameter (e.g., rrc-MessageType) that indicates which PDCP layer SDU message the procedure number and the included segment are associated with. In certain embodiments, the message type parameter indicates one of: a UE Capability Information message (e.g., rrc-MessageType value=ueCapabilityInformation) and a Measurement report message (e.g., rrc-MessageType value=measurementReportAppLayer).

In some embodiments, segmenting the first PDCP layer SDU message occurs in response to the first PDCP layer SDU message exceeding a maximum RRC PDU size limit and segmenting the second PDCP layer SDU message occurs in response to the second PDCP layer SDU message exceeding the maximum RRC PDU size limit.

In some embodiments, the transceiver 925 further transmits a capabilities message to the RAN node, where the capabilities message indicates that uplink message segmentation is supported. In such embodiments, segmenting the first and second PDCP layer SDU messages occurs in response to transmitting the indication that uplink message segmentation is supported.

In various embodiments, wherein the transceiver 925 further receives a third set of segmented RRC messages from the RAN node, the third set of segmented RRC messages comprising segments of a third RRC message and segments of a fourth RRC message, each of the third set of segmented RRC messages comprising a procedure number that indicates a procedure to which an included segment corresponds. In such embodiments, the processor 905 reassembles the received segments into the third and fourth RRC messages based at least on the procedure number of the received segments. Here, a first segment of the fourth RRC message is received prior to receiving a last segment of the third RRC message and a first segment of the third RRC message is received prior to receiving a last segment of the fourth RRC message.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to transmitting message segments in parallel and/or mobile operation. For example, the memory 910 may store various parameters, panel/beam configurations, resource assignments, policies, and the like as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
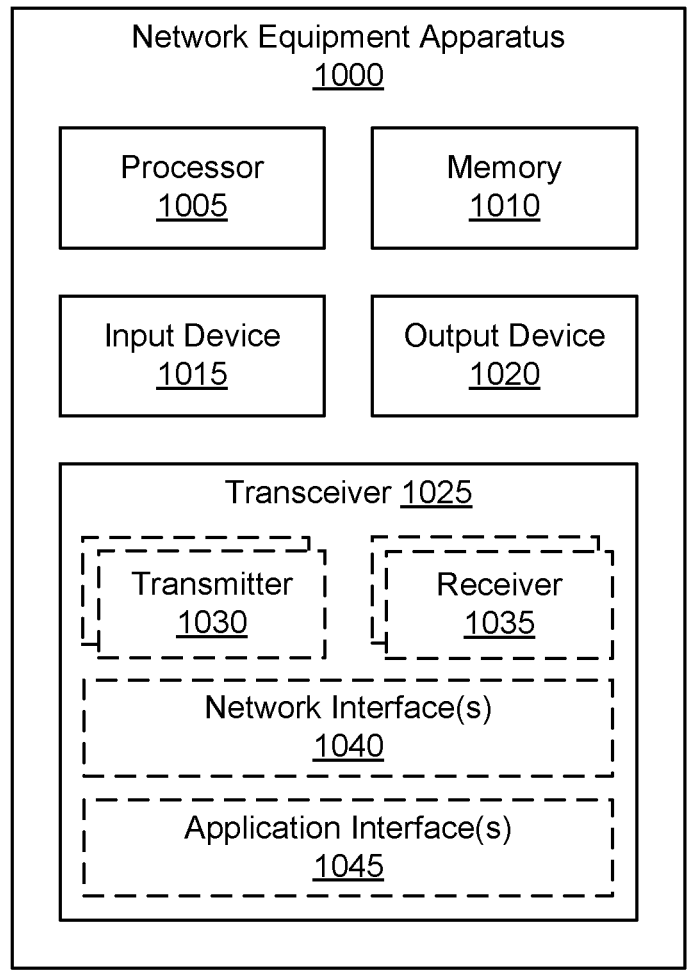
FIG. 10 is a diagram illustrating one embodiment of a network apparatus that may be used for transmitting message segments in parallel.

FIG. 10 depicts a network apparatus 1000 that may be used for transmitting message segments in parallel, according to embodiments of the disclosure. In one embodiment, network apparatus 1000 may be one implementation of a RAN entity used to implement one or more of the above solutions. The network apparatus 1000 may be one embodiment of the base unit 121, the RAN node 210, the first communication device 405, the second communication device 410, the gNB 510, the gNB 610, the gNB 710, the gNB 810, and/or a network/RAN entity, as described above. Furthermore, the network apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network apparatus 1000 may not include any input device 1015 and/or output device 1020. In various embodiments, the network apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the network apparatus 1000 is a RAN node (e.g., gNB) that communicates with one or more UEs, as described herein. In such embodiments, the processor 1005 controls the network apparatus 1000 to perform the above described RAN behaviors. When operating as a RAN node, the processor 1005 may include an application processor (also known as "main processor") which manages application-domain and operating system ("OS") functions and a baseband processor (also known as "baseband radio processor") which manages radio functions.

In various embodiments, the processor 1005 segments a first PDCP layer SDU message into a plurality of first segments and the transceiver 1025 transmits a first set of segmented RRC message to a UE (i.e., via an air/radio interface), each of the first set of segmented RRC messages including one of the plurality of first segments and a procedure number that indicates a procedure to which the included segment corresponds.

The processor 1005 also segments a second PDCP layer SDU message into a plurality of second segments and the transceiver 1025 transmits a second set of segmented RRC messages to the UE in parallel with the first set of segmented RRC messages, each of the second set of segmented RRC messages including one of the plurality of second segments and a procedure number that indicates a procedure to which the included segment corresponds. Here, a first segment of the first set of segmented RRC messages is transmitted prior to transmitting a last segment of the second set of segmented RRC messages and a first segment of the second set of segmented RRC messages is transmitted prior to transmitting a last segment of the first set of segmented RRC messages.

In some embodiments, each of the first and second segmented RRC messages further includes a message type parameter (i.e., rrc-MessageType) that indicates which PDCP layer SDU message the procedure number and the included segment are associated with. In certain embodiments, the message type parameter indicates one of: an RRC Reconfiguration message (e.g., rrc-MessageType value=rrcConfiguration) and an RRC Resume message (e.g., rrc-MessageType value=rrcResume).

In some embodiments, segmenting the first PDCP layer SDU message occurs in response to the first PDCP layer SDU message exceeding a maximum RRC PDU size limit and segmenting the second PDCP layer SDU message occurs in response to the second PDCP layer SDU message exceeding the maximum RRC PDU size limit.

In some embodiments, the transceiver 1025 further receives a capabilities message from the UE device, where the capabilities message indicates that downlink message segmentation is supported. In such embodiments, segmenting the first and second PDCP layer SDU messages occurs in response to receiving the indication that downlink message segmentation is supported.

In various embodiments, wherein the transceiver 1025 further receives a third set of segmented RRC messages from the UE device, the third set of segmented RRC messages comprising segments of a third RRC message and segments of a fourth RRC message, each of the third set of segmented RRC messages comprising a procedure number that indicates a procedure to which an included segment corresponds. In such embodiments, the processor 1005 reassembles the received segments into the third and fourth RRC messages based at least on the procedure number of the received segments. Here, a first segment of the fourth RRC message is received prior to receiving a last segment of the third RRC message and a first segment of the third RRC message is received prior to receiving a last segment of the fourth RRC message.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to transmitting message segments in parallel and/or mobile operation. For example, the memory 1010 may store parameters, configurations, resource assignments, policies, and the like, as described above. In certain embodiments, the memory 1010 also stores program code and related data, such as an operating system or other controller algorithms operating on the apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least transmitter 1030 and at least one receiver 1035. One or more transmitters 1030 may be used to communicate with the UE, as described herein. Similarly, one or more receivers 1035 may be used to communicate with network functions in the Public Land Mobile Network ("PLMN") and/or RAN, as described herein. Although only one transmitter 1030 and one receiver 1035 are illustrated, the network apparatus 1000 may have any suitable number of transmitters 1030 and receivers

1035. Further, the transmitter(s) 1030 and the receiver(s) 1035 may be any suitable type of transmitters and receivers.

Figure 11:
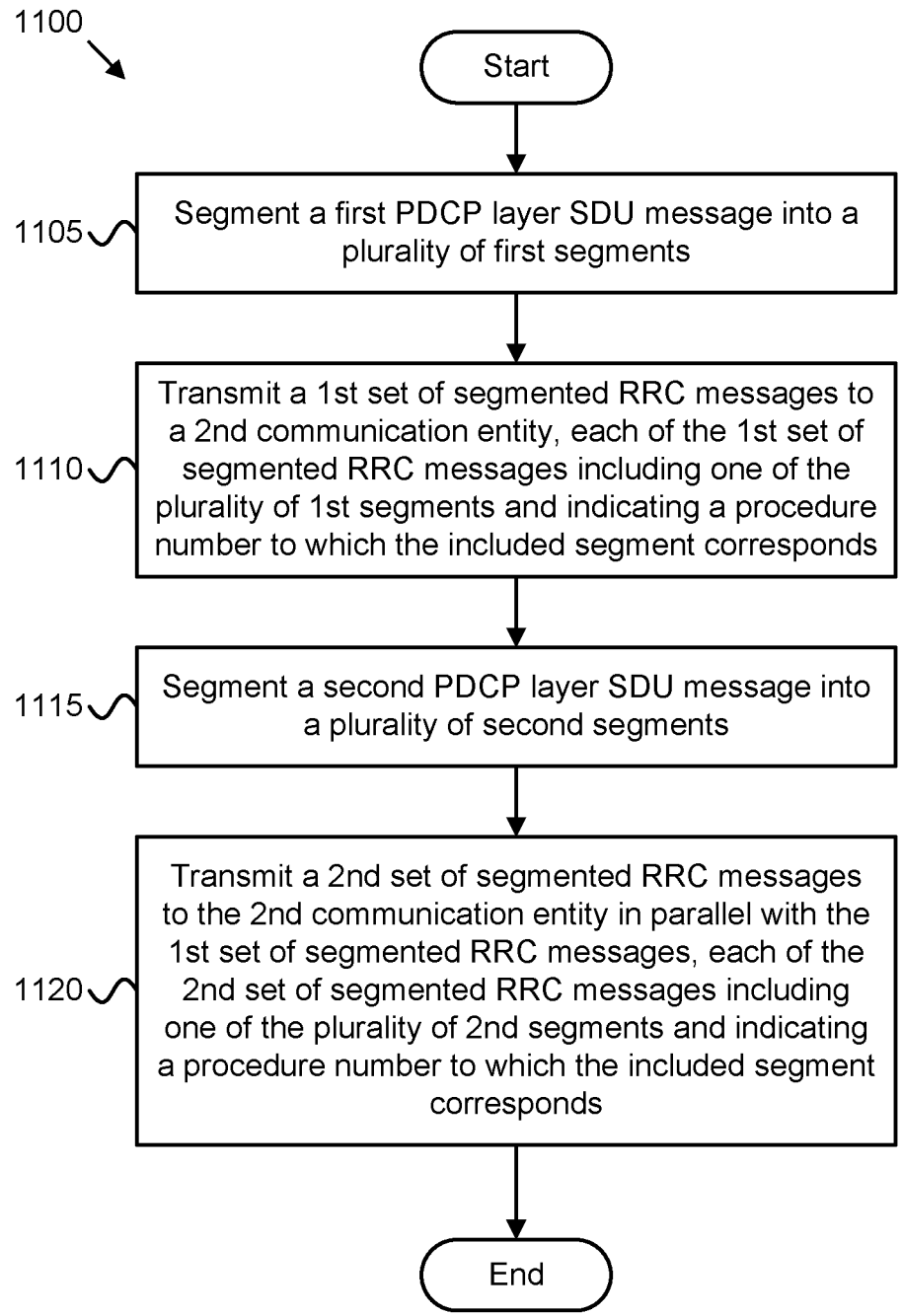
FIG. 11 is a flowchart diagram illustrating one embodiment of a method for transmitting message segments in parallel.

FIG. 11 depicts one embodiment of a method 1100 for transmitting message segments in parallel, according to embodiments of the disclosure. In various embodiments, the method 1100 is performed by a first communication device, such as the remote unit 105, the base unit 121, the UE 205, the RAN node 207, the first communication device 405, the gNB 510, the UE 605, the gNB 710, the UE 805, the user equipment apparatus 900 and/or the network apparatus 1000, described above as described above. In some embodiments, the method 1100 is performed by a processor, such as a microcontroller, a microprocessor, a CPU, a GPU, an auxiliary processing unit, a FPGA, or the like.

The method 1100 begins and segments 1105 a first PDCP layer SDU message into a plurality of first segments. The method 1100 includes transmitting 1110 a first set of segmented RRC messages to a second communication entity, each of the first set of segmented RRC messages indicating a procedure number corresponding to the plurality of first segments and also includes a segment of the plurality of first segments. The method 1100 includes segmenting 1115 a second PDCP layer SDU message into a plurality of second segments. The method 1100 includes transmitting 1120 a second set of segmented RRC messages to the second communication entity in parallel with the first set of segmented RRC messages, each of the second set of segmented RRC messages indicating a procedure number corresponding to the plurality of second segments and also includes a segment of the plurality of second segments. Here, a first segment of the first set of segmented RRC messages is transmitted prior to transmitting a last segment of the second set of segmented RRC messages and a first segment of the second set of segmented RRC messages is transmitted prior to transmitting a last segment of the first set of segmented RRC messages. The method 1100 ends.

Disclosed herein is a first apparatus for transmitting message segments in parallel, according to embodiments of the disclosure. The first apparatus may be implemented by a UE device, such as the remote unit 105, the UE 205, the first communication device 405, the UE 505, the UE 605, the UE 705, the UE 805, and/or the user equipment apparatus 900, described above. The first apparatus includes a transceiver and a processor that segments a first PDCP layer SDU message into a plurality of first segments and segments a second PDCP layer SDU message into a plurality of second segments. The transceiver transmits a first set of segmented RRC message to a RAN node, each of the first set of segmented RRC messages including one of the plurality of first segments and a procedure number that indicates a procedure to which the included segment corresponds.

The transceiver also transmits a second set of segmented RRC messages to the RAN node in parallel with the first set of segmented RRC messages, each of the second set of segmented RRC messages including one of the plurality of second segments and a procedure number that indicates a procedure to which the included segment corresponds. Here, a first of the first set of segmented RRC messages is transmitted prior to transmitting a last of the second set of segmented RRC messages and a first of the second set of segmented RRC messages is transmitted prior to transmitting a last of the first set of segmented RRC messages.

In some embodiments, each of the first and second segmented RRC messages further includes a message type parameter (e.g., rrc-MessageType) that indicates which PDCP layer SDU message the procedure number and the included segment are associated with. In certain embodiments, the message type parameter indicates one of: a UE Capability Information message (e.g., rrc-MessageType value=ueCapabilityInformation) and a Measurement report message (e.g., rrc-MessageType value=measurementReportAppLayer).

In some embodiments, segmenting the first PDCP layer SDU message occurs in response to the first PDCP layer SDU message exceeding a maximum RRC PDU size limit and segmenting the second PDCP layer SDU message occurs in response to the second PDCP layer SDU message exceeding the maximum RRC PDU size limit.

In some embodiments, the transceiver further transmits a capabilities message to the RAN node, where the capabilities message indicates that uplink message segmentation is supported. In such embodiments, segmenting the first and second PDCP layer SDU messages occurs in response to transmitting the indication that uplink message segmentation is supported.

In various embodiments, wherein the transceiver further receives a third set of segmented RRC messages from the RAN node, the third set of segmented RRC messages comprising segments of a third RRC message and segments of a fourth RRC message, each of the third set of segmented RRC messages comprising a procedure number that indicates a procedure to which an included segment corresponds. In such embodiments, the processor reassembles the received segments into the third and fourth RRC messages based at least on the procedure number of the received segments. Here, a first segment of the fourth RRC message is received prior to receiving a last segment of the third RRC message and a first segmented of the third RRC message is received prior to receiving a last segment of the fourth RRC message.

Disclosed herein is a second apparatus for transmitting message segments in parallel, according to embodiments of the disclosure. The second apparatus may be implemented by a RAN entity, such as the base unit 121, the RAN node 210, the first communication device 405, the gNB 510, the gNB 610, the gNB 710, the gNB 810, and/or the network apparatus 1000, described above. The second apparatus includes a transceiver and a processor that segments a first PDCP layer SDU message into a plurality of first segments and segments a second PDCP layer SDU message into a plurality of second segments. The transceiver transmits a first set of segmented RRC messages to a UE device, each of the first set of segmented RRC messages including a segment of the plurality of first segments and a procedure number that indicates a procedure to which the included segment corresponds.

The transceiver also transmits a second set of segmented RRC messages to the UE device in parallel with the first set of segmented RRC messages, each of the second set of segmented RRC messages including one of the plurality of second segments and a procedure number that indicates a procedure to which the included segment corresponds. Here, a first of the first set of segmented RRC messages is transmitted prior to transmitting a last of the second set of segmented RRC messages a first of the second set of segmented RRC messages is transmitted prior to transmitting a last of the first set of segmented RRC messages.

In some embodiments, each of the first and second segmented RRC messages further includes a message type parameter (i.e., rrc-MessageType) that indicates which PDCP layer SDU message the procedure number and the included segment are associated with. In certain embodiments, the message type parameter indicates one of: an RRC Reconfiguration message (e.g., rrc-MessageType value=rrcConfiguration) and an RRC Resume message (e.g., rrc-MessageType value=rrcResume).

In some embodiments, segmenting the first PDCP layer SDU message occurs in response to the first PDCP layer SDU message exceeding a maximum RRC PDU size limit and segmenting the second PDCP layer SDU message occurs in response to the second PDCP layer SDU message exceeding the maximum RRC PDU size limit.

In some embodiments, the transceiver further receives a capabilities message from the UE device, where the capabilities message indicates that downlink message segmentation is supported. In such embodiments, segmenting the first and second PDCP layer SDU messages occurs in response to receiving the indication that downlink message segmentation is supported.

In various embodiments, wherein the transceiver further receives a third set of segmented RRC messages from the UE device, the third set of segmented RRC messages comprising segments of a third RRC message and segments of a fourth RRC message, each of the third set of segmented RRC messages comprising a procedure number that indicates a procedure to which an included segment corresponds. In such embodiments, the processor reassembles the received segments into the third and fourth RRC messages based at least on the procedure number of the received segments. Here, a first segment of the fourth RRC message is received prior to receiving a last segment of the third RRC message and a first segmented of the third RRC message is received prior to receiving a last segment of the fourth RRC message.

Disclosed herein is a first method for transmitting message segments in parallel, according to embodiments of the disclosure. The first method may be performed by a first communication device, such as the remote unit 105, the base unit 121, the UE 205, the RAN node 207, the first communication device 405, the UE 505, the gNB 510, the UE 605, the gNB 610, the UE 705, the gNB 710, the UE 805, the gNB 810, the user equipment apparatus 900 and/or the network apparatus 1000, described above. The first method includes segmenting a first PDCP layer SDU message into a plurality of first segments and transmitting a first set of segmented RRC messages to a second communication entity, each of the first set of segmented RRC messages indicating a procedure number corresponding to the plurality of first segments and also includes a segment of the plurality of first segments. The first method includes segmenting a second PDCP layer SDU message into a plurality of second segments and transmitting a second set of segmented RRC messages to the second communication entity in parallel with the first set of segmented RRC messages, each of the second set of segmented RRC messages indicating a procedure number corresponding to the plurality of second segments and also includes a segment of the plurality of second segments. Here, a first of the first set of segmented RRC messages is transmitted prior to transmitting a last of the second set of segmented RRC messages and a first of the second set of segmented RRC messages is transmitted prior to transmitting a last of the first set of segmented RRC messages.

In some embodiments, each of the first and second segmented RRC messages further includes a message type parameter (e.g., rrc-MessageType) that indicates which PDCP layer SDU message the procedure number and the included segment are associated with.

In certain embodiments, the message type parameter indicates one of: an RRC Reconfiguration message (e.g., rrc-MessageType value=rrcConfiguration) and an RRC Resume message (e.g., rrc-MessageType value=rrcResume). In other embodiments, the message type parameter indicates one of: a UE Capability Information message (e.g., rrc-MessageType value=ueCapabilityInformation) and a Measurement report message (e.g., rrc-MessageType value=measurementReportAppLayer).

In some embodiments, segmenting the first PDCP layer SDU message occurs in response to the first PDCP layer SDU message exceeding a maximum RRC PDU size limit and segmenting the second PDCP layer SDU message occurs in response to the second PDCP layer SDU message exceeding the maximum RRC PDU size limit.

In some embodiments, the first communication entity comprises a RAN node in a mobile communication network and the second communication entity comprises a UE device. In certain embodiments, the first method further includes receiving a capabilities message from the second communication entity, where the capabilities message indicates that downlink message segmentation is supported. In such embodiments, segmenting the first and second PDCP layer SDU messages occurs in response to receiving the indication that downlink message segmentation is supported.

In some embodiments, the first communication entity comprises a UE device and the second communication entity comprises a RAN node in a mobile communication network. In certain embodiments, the first method further includes transmitting a capabilities message to the second communication entity (i.e., RAN node), where the capabilities message indicates that uplink message segmentation is supported. In such embodiments, segmenting the first and second PDCP layer SDU messages occurs in response to transmitting the indication that uplink message segmentation is supported.

In various embodiments, the first method includes receiving a third set of segmented RRC messages from the second communication entity, the third set of segmented RRC messages comprising segments of a third RRC message and segments of a fourth RRC message, each of the third set of segmented RRC messages comprising a procedure number that indicates a procedure to which an included segment corresponds. In such embodiments, the first method includes reassembling the received segments into the third and fourth RRC messages based at least on the procedure number of the received segments. Here, a first segment of the fourth RRC message is received prior to receiving a last segment of the third RRC message and a first segmented of the third RRC message is received prior to receiving a last segment of the fourth RRC message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a first communication entity, the method comprising:
  segmenting a first Packet Data Convergence Protocol ("PDCP") layer Service Data Unit ("SDU") message into a plurality of first segments;
  transmitting a first set of segmented Radio Resource Control ("RRC") messages to a second communication entity, each of the first set of segmented RRC messages indicating a procedure number corresponding to the plurality of first segments and also includes a segment of the plurality of first segments;

segmenting a second PDCP layer SDU message into a plurality of second segments; and transmitting a second set of segmented RRC messages to the second communication entity in parallel with the first set of segmented RRC messages, each of the second set of segmented RRC messages indicating a procedure number corresponding to the plurality of second segments and includes a segment of the plurality of second segments, wherein a first of the second set of segmented RRC messages is transmitted prior to transmitting a last of the first set of segmented RRC messages.

2. The method of claim 1, wherein each of the first and second segmented RRC messages further includes a message type parameter that indicates which PDCP layer SDU message the procedure number and the included segment are associated with.

3. The method of claim 2, wherein the message type parameter indicates one of: an RRC Reconfiguration message and an RRC Resume message.

4. The method of claim 2, wherein the message type parameter indicates one of: a UE Capability Information message and a Measurement report message.

5. The method of claim 1, wherein segmenting the first PDCP layer SDU message occurs in response to the first PDCP layer SDU message exceeding a maximum RRC Protocol Data Unit ("PDU") size limit and wherein segmenting the second PDCP layer SDU message occurs in response to the second PDCP layer SDU message exceeding the maximum RRC PDU size limit.

6. The method of claim 1, wherein the first communication entity comprises a Radio Access Network ("RAN") node in a mobile communication network and the second communication entity comprises a User Equipment ("UE").

7. The method of claim 6, further comprising receiving a capabilities message from the second communication entity, wherein the capabilities message indicates that downlink message segmentation is supported, and wherein segmenting the first and second PDCP layer SDU messages occurs in response to receiving the indication that downlink message segmentation is supported.

8. The method of claim 1, wherein the first communication entity comprises a User Equipment ("UE") and the second communication entity comprises a Radio Access Network ("RAN") node in a mobile communication network.

9. The method of claim 8, further comprising transmitting a capabilities message to the second communication entity, wherein the capabilities message indicates that uplink message segmentation is supported, and wherein segmenting the first and second PDCP layer SDU messages occurs in response to transmitting the indication that uplink message segmentation is supported.

10. The method of claim 1, further comprising:

receiving a third set of segmented RRC messages from the second communication entity, the third set of segmented RRC messages comprising segments of a third RRC message and segments of a fourth RRC message, each of the third set of segmented RRC messages comprising a procedure number that indicates a procedure to which an included segment corresponds, wherein a first segment of the fourth RRC message is received prior to receiving a last segment of the third RRC message; and reassembling the received segments into the third and fourth RRC messages based at least on the procedure number of the received segments.

11. A radio access network ("RAN") node comprising:

a processor that:

segments a first Packet Data Convergence Protocol ("PDCP") layer Service Data Unit ("SDU") message into a plurality of first segments; and segments a second PDCP layer SDU message into a plurality of second segments; and a transceiver that:

transmits a first set of segmented Radio Resource Control ("RRC") messages to a User Equipment ("UE"), each of the first set of segmented RRC messages including one of the plurality of first segments and a procedure number that indicates a procedure to which the included segment corresponds; and transmits a second set of segmented RRC messages to the UE in parallel with the first set of segmented RRC messages, each of the second set of segmented RRC messages including one of the plurality of second segments and a procedure number that indicates a procedure to which the included segment corresponds, wherein a first of the second set of segmented RRC messages is transmitted prior to transmitting a last of the first set of segmented RRC messages.

12. The RAN node of claim 11, wherein each of the first and second segmented RRC messages further includes a message type parameter that indicates which PDCP layer SDU message the procedure number and the included segment are associated with, wherein the message type parameter indicates one of: an RRC Reconfiguration message and an RRC Resume message.

13. The RAN node of claim 11, wherein segmenting the first PDCP layer SDU message occurs in response to the first PDCP layer SDU message exceeding a maximum RRC Protocol Data Unit ("PDU") size limit and wherein segmenting the second PDCP layer SDU message occurs in response to the second PDCP layer SDU message exceeding the maximum RRC PDU size limit.

14. The RAN node of claim 11, wherein the transceiver further receives a capabilities message from the UE, wherein the capabilities message indicates that downlink message segmentation is supported, and wherein segmenting the first and second PDCP layer SDU messages occurs in response to receiving the indication that downlink message segmentation is supported.

15. The RAN node of claim 11, wherein the transceiver further receives a third set of segmented RRC messages from the UE, the third set of segmented RRC messages comprising segments of a third RRC message and segments of a fourth RRC message, each of the third set of segmented RRC messages comprising a procedure number that indicates a procedure to which an included segment corresponds, wherein a first segment of the fourth RRC message is received prior to receiving a last segment of the third RRC message; and wherein the processor reassembles the received segments into the third and fourth RRC messages based at least on the procedure number of the received segments.

16. A User Equipment ("UE") comprising:

a processor that:

segments a first Packet Data Convergence Protocol ("PDCP") layer Service Data Unit ("SDU") message into a plurality of first segments; and segments a second PDCP layer SDU message into a plurality of second segments; and a transceiver that:

transmits a first set of segmented Radio Resource Control ("RRC") message to a Radio Access Network ("RAN") node, each of the first set of segmented RRC messages including one of the plurality of first segments and a procedure number that indicates a procedure to which the included segment corresponds; and transmits a second set of segmented RRC messages to the RAN node in parallel with the first set of segmented RRC messages, each of the second set of segmented RRC messages including one of the plurality of second segments and a procedure number that indicates a procedure to which the included segment corresponds, wherein a first of the second set of segmented RRC messages is transmitted prior to transmitting a last of the first set of segmented RRC messages.

17. The UE of claim 16, wherein each of the first and second segmented RRC messages further includes a message type parameter that indicates which PDCP layer SDU message the procedure number and the included segment are associated with, wherein the message type parameter indicates one of: a UE Capability Information message and a Measurement report message.

18. The UE of claim 16, wherein segmenting the first PDCP layer SDU message occurs in response to the first PDCP layer SDU message exceeding a maximum RRC Protocol Data Unit ("PDU") size limit and wherein segmenting the second PDCP layer SDU message occurs in response to the second PDCP layer SDU message exceeding the maximum RRC PDU size limit.

19. The UE of claim 16, wherein the transceiver further transmits a capabilities message to the RAN node, wherein the capabilities message indicates that uplink message segmentation is supported, and wherein segmenting the first and second PDCP layer SDU messages occurs in response to transmitting the indication that uplink message segmentation is supported.

20. The UE of claim 16, wherein the transceiver further receives a third set of segmented RRC messages from the RAN node, the third set of segmented RRC messages comprising segments of a third RRC message and segments of a fourth RRC message, each of the third set of segmented RRC messages comprising a procedure number that indicates a procedure to which an included segment corresponds, wherein a first segment of the fourth RRC message is received prior to receiving a last segment of the third RRC message; and wherein the processor reassembles the received segments into the third and fourth RRC messages based at least on the procedure number of the received segments.

* * * * *